(12) United States Patent
Kotikalapoodi

(10) Patent No.: US 9,250,694 B1
(45) Date of Patent: Feb. 2, 2016

(54) METHOD AND APPARATUS FOR FAST, EFFICIENT, LOW NOISE POWER SUPPLY

(71) Applicant: Sridhar Kotikalapoodi, Sunnyvale, CA (US)

(72) Inventor: Sridhar Kotikalapoodi, Sunnyvale, CA (US)

( * ) Notice: Subject to any disclaimer, the term of this patent is extended or adjusted under 35 U.S.C. 154(b) by 167 days.

(21) Appl. No.: 13/891,664

(22) Filed: May 10, 2013

(51) Int. Cl.
*G05F 1/00* (2006.01)
*G06F 1/32* (2006.01)

(52) U.S. Cl.
CPC .................................. *G06F 1/3287* (2013.01)

(58) Field of Classification Search
USPC .......... 323/222–225, 266–277, 280–285, 337
See application file for complete search history.

(56) References Cited

U.S. PATENT DOCUMENTS

| | | | |
|---|---|---|---|
| 4,114,115 A * | 9/1978 | Minnis ............................. | 333/14 |
| 7,068,019 B1 * | 6/2006 | Chiu ............................... | 323/281 |
| 8,531,237 B2 * | 9/2013 | Aisu ............................... | 327/558 |
| 2005/0046401 A1 * | 3/2005 | Inn et al. ........................ | 323/282 |
| 2005/0046474 A1 * | 3/2005 | Matsumoto et al. ............ | 330/10 |
| 2006/0132112 A1 * | 6/2006 | Oswald et al. ................. | 323/282 |
| 2006/0192616 A1 * | 8/2006 | Takahashi et al. ............. | 330/141 |
| 2006/0273771 A1 * | 12/2006 | van Ettinger et al. ......... | 323/273 |
| 2008/0026719 A1 * | 1/2008 | Chiu et al. ..................... | 455/296 |
| 2009/0189691 A1 * | 7/2009 | Deng et al. ..................... | 330/149 |
| 2009/0212753 A1 * | 8/2009 | Lou ................................ | 323/277 |
| 2009/0258626 A1 * | 10/2009 | Yamada et al. ............. | 455/253.2 |
| 2010/0040178 A1 * | 2/2010 | Sutton et al. .................. | 375/345 |
| 2010/0066415 A1 * | 3/2010 | Mauro et al. .................. | 327/100 |
| 2010/0259106 A1 * | 10/2010 | Wang et al. .................... | 307/80 |
| 2011/0115571 A1 * | 5/2011 | Nakamura et al. ............ | 332/105 |
| 2012/0142298 A1 * | 6/2012 | Winoto et al. ............. | 455/234.1 |
| 2012/0223685 A1 * | 9/2012 | Tsai et al. ...................... | 323/270 |
| 2013/0063113 A1 * | 3/2013 | Couleur et al. ................ | 323/282 |
| 2013/0207731 A1 * | 8/2013 | Balteanu ....................... | 330/296 |
| 2014/0015568 A1 * | 1/2014 | Shimamune et al. ......... | 327/103 |

* cited by examiner

*Primary Examiner* — Nugyen Tran
*Assistant Examiner* — Yusef Ahmed
(74) *Attorney, Agent, or Firm* — Heimlich Law, PC; Alan Heimlich, Esq.

(57) ABSTRACT

A method and apparatus for fast, efficient, low noise power supply have been disclosed. In one implementation a switching power supply and a linear regulator provide efficiency and rapid response.

17 Claims, 7 Drawing Sheets

US 9,250,694 B1

METHOD AND APPARATUS FOR FAST, EFFICIENT, LOW NOISE POWER SUPPLY

RELATED APPLICATION

The present Application for Patent is related to U.S. patent application Ser. No. 13/891,646 titled "Method and Apparatus for Fast, Efficient, Low Noise Power Supply" filed May 10, 2013 pending by the same inventor which is hereby incorporated herein by reference.

FIELD OF THE INVENTION

The present invention pertains to power supplies. More particularly, the present invention relates to Method and Apparatus for Fast, Efficient, Low Noise Power Supply.

BACKGROUND OF THE INVENTION

A fast response and efficient power supply is needed for many electronic devices. For example, if the RF (Radio Frequency) Power Amplifier in a mobile phone is powered directly from a battery, the battery supply voltage may be too high, resulting in excess power dissipation in the power amplifier. This presents a technical problem for which a technical solution using a technical means is needed.

BRIEF DESCRIPTION OF THE DRAWINGS

The invention is illustrated by way of example and not limitation in the figures of the accompanying drawings in which.

DETAILED DESCRIPTION

The invention, in one embodiment, is a power supply which provides a reduced voltage which results in a more efficient power amplifier resulting in longer battery run time.

In one embodiment of the invention as applied to, for example RF power amplifiers, there is provided a power supply which can change its output voltage fast enough to track the rapidly changing power requirements of the power amplifier in real time.

In one embodiment of the invention, linear regulators are fast and used so that they are more efficient than a pure linear regulator approach. That is, in one embodiment of the invention without using a pure linear regulator for full power a more efficient approach is used.

In one embodiment of the invention, switch mode power supplies are efficient and used so that they are faster than a pure switch mode power supply approach. That is, in one embodiment of the invention without using a pure switch mode power supply for full power a faster power supply response is provided.

In one embodiment of the invention, without increasing the switching frequency of the switch mode supply which increases switching losses and hence decreases the efficiency is provided a fast responding power supply.

In one embodiment of the invention, without placing a switching regulator output to directly couple to a linear regulator output in parallel, with a linear regulator a fast responding power supply is described.

In one embodiment of the invention, without placing a switching regulator output to directly couple to a linear regulator output in parallel, with a linear regulator a more efficient power supply than the linear regulator with push-pull output is provided without the need for a large amount of excess current to cancel the inductor ripple current at the switching frequency of the switcher.

Figure 3:
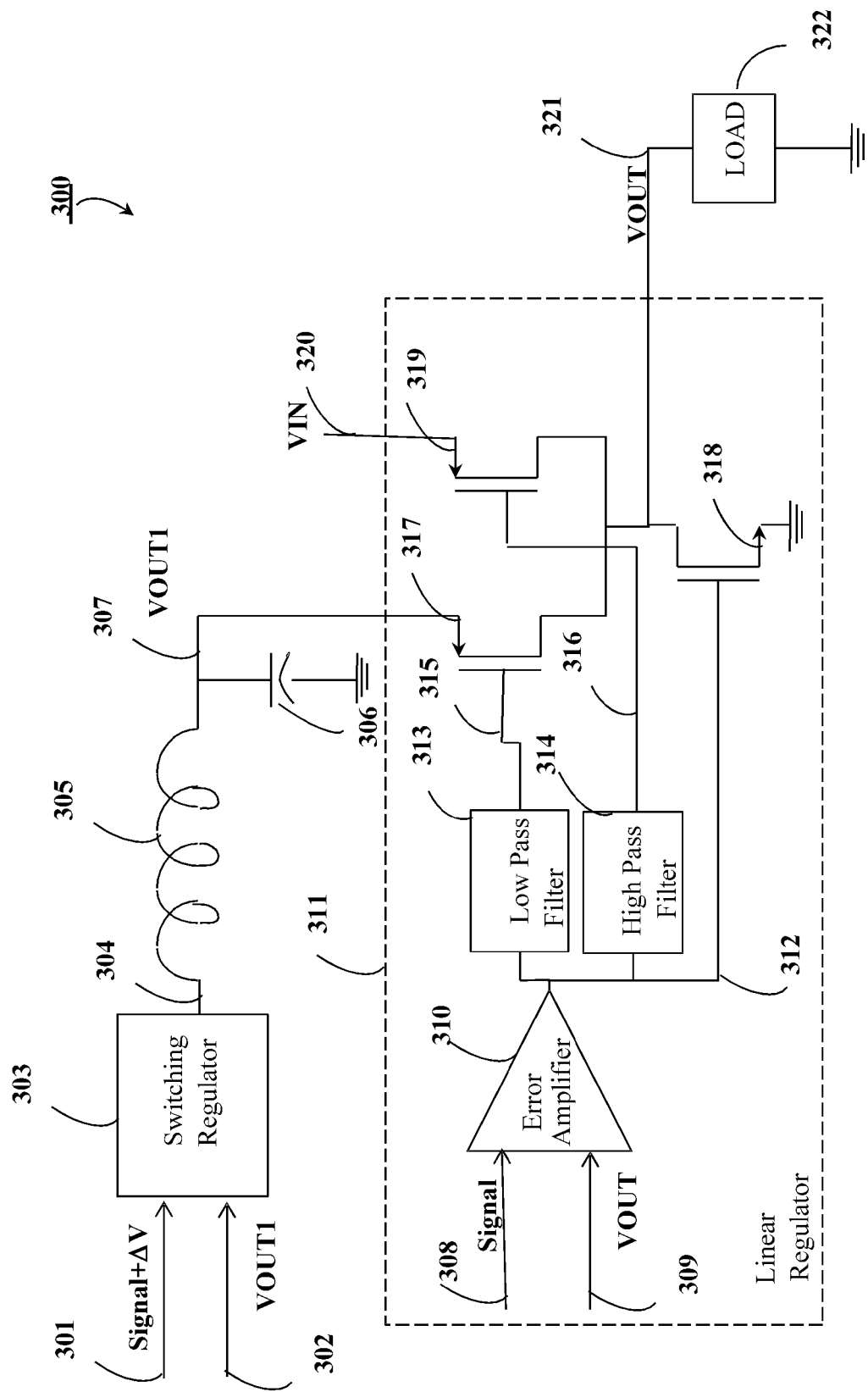
FIG. 3 illustrates one embodiment of the invention.

FIG. 3 illustrates, generally at 300, one embodiment of the invention. The power supply system 300 includes a low-speed power supply 303 (for example, but not limited to, a buck type switching power supply a switching regulator output 304, an inductor 305, and an output capacitor 306), a linear regulator 311 which is may be a low drop out regulator (LDO) with output push-pull devices coupled to the output VOUT 321. The low speed supply regulates output VOUT1 307 by sensing VOUT1 through sense network 302 and comparing it with signal plus added offset $\Delta V$ 301. The LDO 311 regulates the output VOUT 321 by sensing the output through sense network 309 and comparing it with signal 308. The error amplifier 310 generates an error signal 312 and in addition may include an optional loop compensation network and biasing control network for the push-pull output stage devices 317, 318, 319. Unlike a common push-pull regulator with a single pull-up device, the regulator 311 has two pull-up devices 317 and 319. The pull-up device 317 is coupled between the output of the low-speed power supply VOUT1 307 and the output VOUT 321. Because the switching regulator 303 is designed to be low speed, its output VOUT1 307 is low-speed and because the regulator 303 is of a switching type, it provides efficient power. The offset $\Delta V$ between the signals 301 and 308 is chosen to optimize the efficiency of the power supply 300 and still provide enough headroom for the power device 317 to provide sufficient power to the load 322 at DC and low signal frequencies and sufficient rejection of switching ripple inherent in switching power supply output VOUT1 307. The higher the $\Delta V$, the better the ripple rejection provided by the device 317 from coupling this ripple to the output 321 but more power is dissipated across this pull-up device 317. The error signal 312 is low pass filtered at low pass filter 313 and this low pass filtered signal 315 drives the pull-up device 317 which provides the low-speed pull-up power to the load 322. Outside the frequency range of the low pass signal 315, the device 317 could be turned off to let device 319 provide pull-up power to VOUT1 307 in addition to the load 322 at VOUT 321.

Because the device 317 can only provide low-speed power as the switching regulator 303 is of low-speed, and if the signal 308 is high frequency and is moving up, the output of the low speed supply VOUT1 307 cannot track the signal fast enough, thus the device 317 doesn't have enough head room to power the load 322 at high speed signal 308 frequencies. The device 319 is coupled between voltage rail VIN 320 and the output 321. VIN is a supply which is higher in voltage than VOUT1 and could be, for example, but not limited to, the battery supply in the mobile phone but also could connect to a power supply which can provide high enough voltage at VIN to provide the required power at the output 321. The error signal 312 is high pass filtered at high pass filter 314 and this high pass filtered signal 316 drives the pull up device 319 to provide high-speed pull-up power to the load 322. Outside the frequency range of the high pass signal 316, the device 319 is turned off. The supply VIN could provide power at all signal frequencies but since it is higher than the minimum required voltage, it will not be very efficient. Thus combining the power to the load through two parallel devices 317 and 319, with device 317 providing low speed but efficient power and 319 providing high speed power, this results in an efficient power supply.

In one embodiment of the invention, for example as illustrated in FIG. 3 the error signal 312 also drives the current sink device 318 which is coupled to the output VOUT 321, thus providing push-pull capability to the regulator 311.

In one embodiment of the invention, for example as illustrated in FIG. 3 low pass filter's 313 and high pass filter's 314 frequency responses should be chosen such that there is uninterrupted power delivered to the output VOUT 321 through at least one of the pull-up devices 317 and 319. In addition, it is wise to choose the low pass filter response such that it is slower than the response of the low speed supply regulator 303 so that VOUT1 307 has reached a steady state and high enough voltage to provide the needed headroom for the low pass power device 317.

In one embodiment of the invention, for example as illustrated in FIG. 3 as can be seen, the embodiment of the present invention does not require excessive current being supplied by the linear regulator to cancel the switch mode supply ripple current.

There are several ways to implement the offset ΔV to the signal 301. For example, it could be implemented by using different devices sizes for the input differential pair of the error amplifier 310 in the input stage of the switching mode power supply 303. Other ways to implement a ΔV are known to those skilled in the art such as, but not limited to a summing amplifier, etc.

The feedback network 302 and 309 for the regulators 303 and 311 respectively could be a direct electrical connection to the outputs 307 and 321 or could include a resistor divider network from VOUT1 307 to ground and VOUT 321 to ground, or other means known to those skilled in the art.

In one embodiment of the invention, for example as illustrated in FIG. 3 when the load which is proportional to the signal 308, is low, the switching power transistors of the switcher 303 could be disabled or scaled down to minimize switching losses as they become significant compared to load at low signal levels. In this case, the load is directly supplied by the power device 319.

Figure 4:
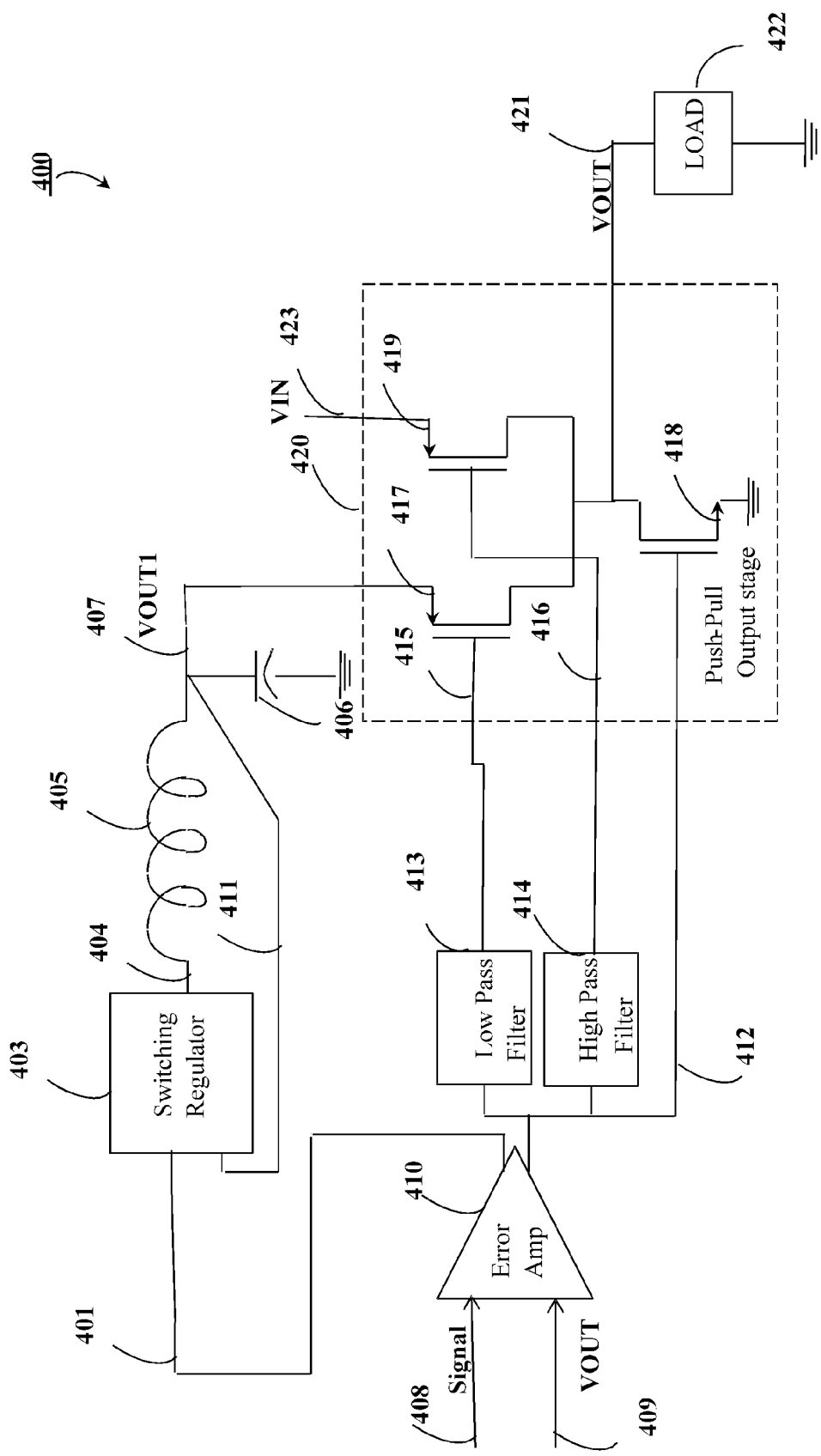
FIG. 4 illustrates a second embodiment of the invention.

FIG. 4 illustrates, generally at 400, one embodiment of the invention. The power supply system 400 is substantially similar to the power supply system 300 of FIG. 3 in many respects and differs in that the signals VOUT1 302 and signal+ΔV 301 of power supply 300 are eliminated and the error amplifier 410 provides an additional error signal 401. Similar to the power system of FIG. 3, the low speed power and high speed power delivered to the load 422 is obtained by combining the power from pull up sources 417 and 419. In the power supply 300 of FIG. 3, the VOUT1 is offset higher due to the signal offset ΔV in the signal 301, this provides headroom for the low speed power device VOUT1 307 to provide power to the load and in addition provides isolation of switching ripple from being coupled into the load 322. Since this offset ΔV decreases the efficiency as it is lost as heat dissipated across the pull up device 317, this is optimized in the implementation of the power system 400. Here, the device 407 unlike being in saturation like the device 317, is instead completely turned-on and acts as a switch when it's delivering power. Since the voltage drop across a switch is smaller than when it's in saturation, the power dissipated is smaller than in the power system of 300, thus further increasing efficiency. In addition, the isolation of switching ripple present in signal VOUT1 407 to couple into the load 422 is prevented by choosing the frequency response of the low pass filter 413 to be lower than the switching frequency of the switching regulator 403 thus making the power device 417 turn-off at switching frequency and isolating the switching frequency ripple from the load 422.

Switching regulator 403 has an output 404, an inductor 405, and an output capacitor 406. VOUT1 407 is fed back to switching regulator 403 via feedback signal 411.

The error signal 401 is similar to the 412 error signal and is generated by comparing VOUT 409 with the reference signal 408. Having two error signals 401 and 412, one for the slow speed switching regulator 403 and other for the push pull output stage 420 gives additional degrees of freedom in choosing different loop gains, bias control and compensation networks for these two loops.

Push-pull output stage 420 has VIN 423, pull up devices 417 and 419, and pull down device 418. VOUT 421 is at the junction of devices 417, 418, and 419. Device 417 is driven by the output signal 415 of the low pass filter 413, and device 419 is driven by the output signal 416 of the high pass filter 414.

The devices types of 317, 318, 319, 417, 418, 419 are shown for examples. They could be of complimentary CMOS devices, Bipolar devices, DMOS devices, or NMOS devices could be replaced by PMOS devices or vice-versa.

The power systems of the present invention could be implemented in CMOS, BiCMOS, BCD, GaAs, SOI or other processes.

Figure 5:
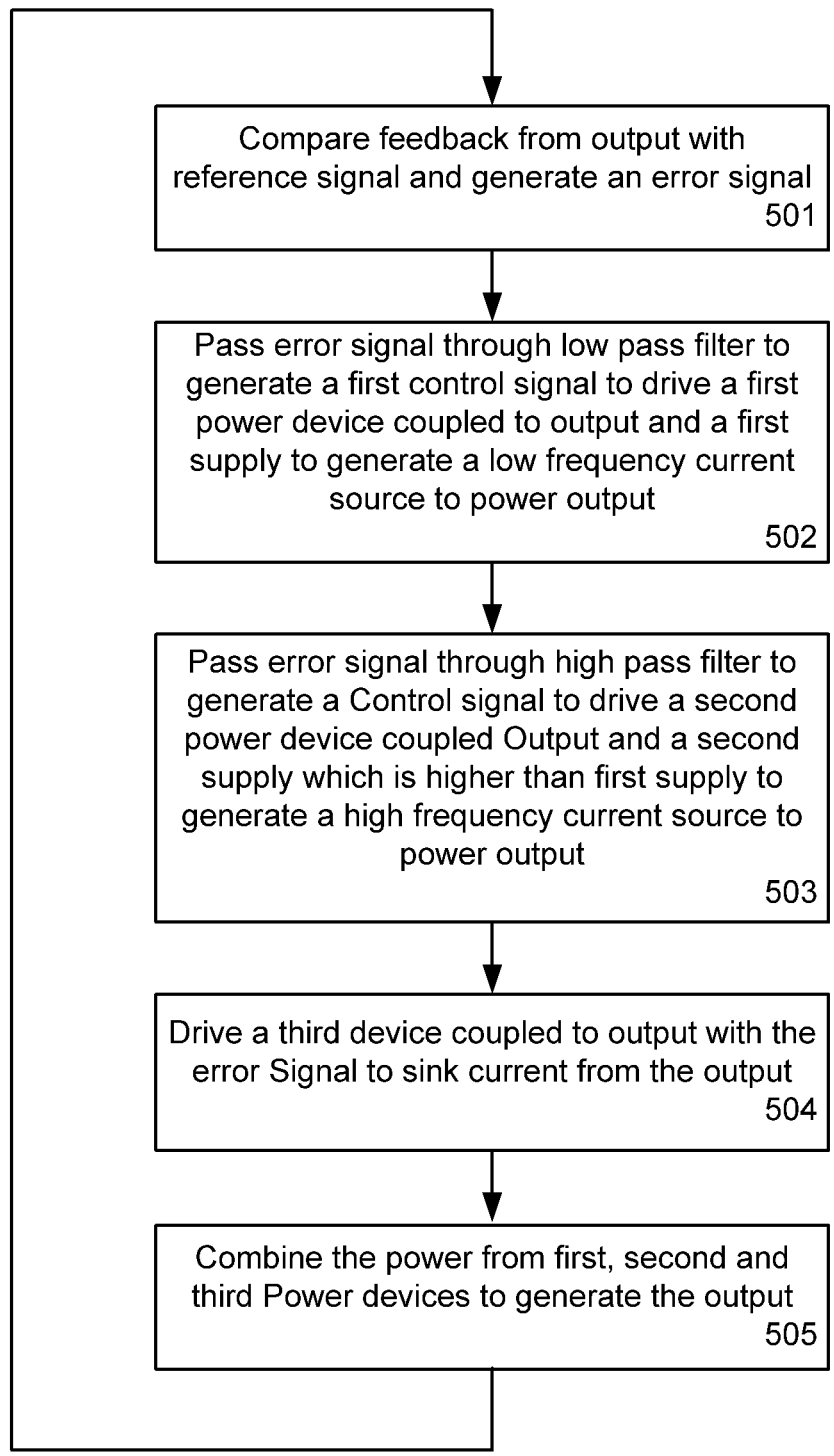
FIG. 5 illustrates one embodiment of the invention in flow chart form.

FIG. 5 illustrates, generally at 500, one embodiment of the invention. At 501 Compare feedback from output with reference signal and generate an error signal. At 502 Pass error signal through low pass filter to generate a first control signal to drive a first power device coupled to output and a first supply to generate a low frequency current source to power output. At 503 Pass error signal through high pass filter to generate a Control signal to drive a second power device coupled Output and a second supply which is higher than first supply to generate a high frequency current source to power output. At 504 Drive a third device coupled to output with the error Signal to sink current from the output. At 505 Combine the power from first, second and third Power devices to generate the output.

In one embodiment of the invention, for example, as illustrated in FIG. 5, is shown a method of generating a power from the power supply according to the present invention. Referring to FIG. 5 together with FIG. 3, the error amplifier 310 compares the output 309 with the reference signal 308 and generates the error signal 312 as described in 501, this error signal 312 is low pass filtered by 313 to generate control signal 315 for the power device 317 to generate the low frequency current source in 502. The error signal 312 is high pass filtered by 314 to generate a control signal 316 to control power device 319 to generate high frequency current source in 503. The device 318 provides the current sink described in 504. The three devices are coupled at node 321 to generate combined power for the load 322 as described in 504

Figure 6:
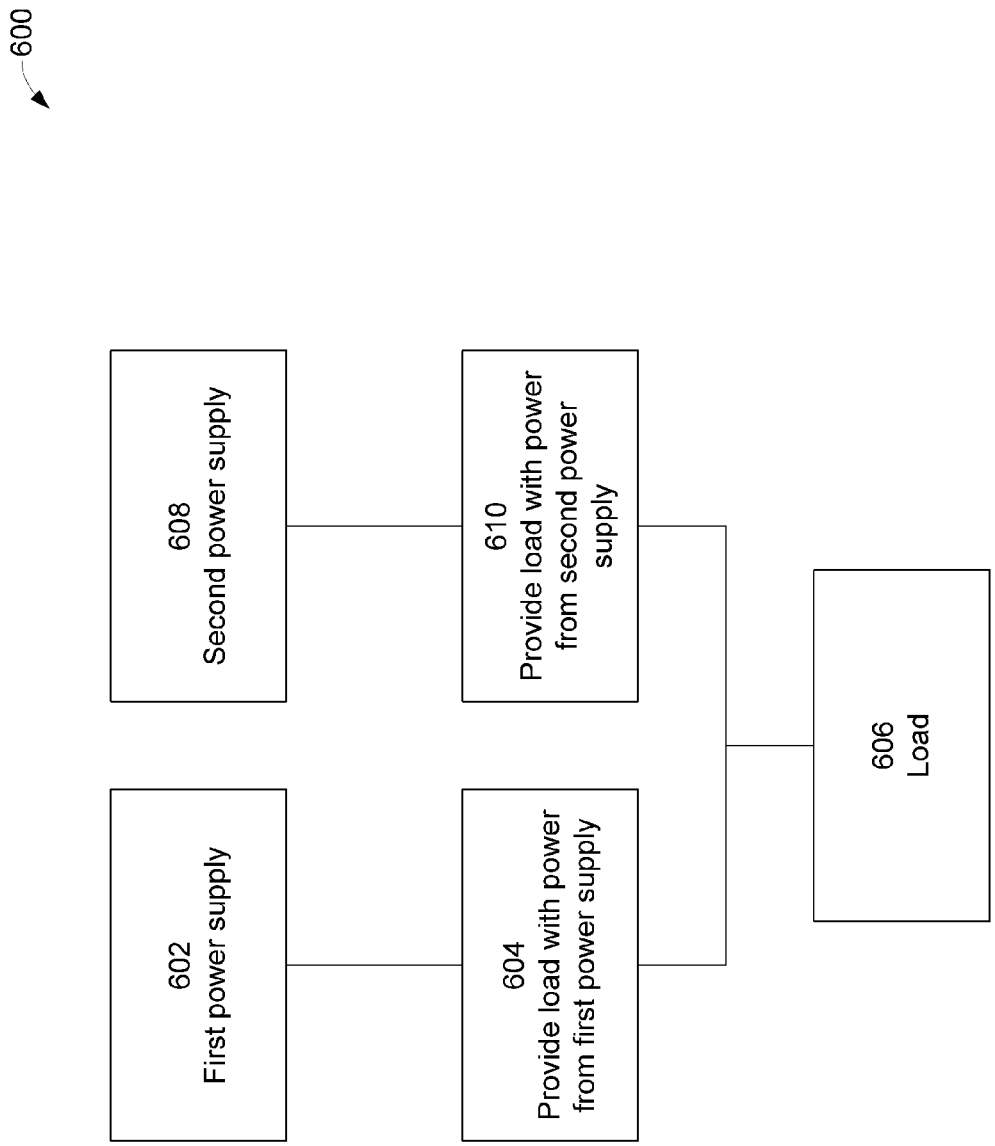
FIG. 6 illustrates one embodiment of the invention in block form.

FIG. 6 illustrates, generally at 600, one embodiment of the invention. At 606 is a load that varies in response to a signal input. At 602 is a power supply that has frequency response up to a first frequency. Thus when the signal input to 604 is at or below this first frequency power supply 602 is capable of responding and providing power to load 606. When the signal frequency is above the first frequency then power supply 602 is not capable of responding fast enough and supplying sufficient power to load 606 and this is when power supply 608 supplies additional power needed through device 610. That is, power supply 608 and device 610 operate at the first frequency and above. Thus load 606 will be supplied sufficient power.

In one embodiment of the invention, for example, as illustrated in FIG. 6, power supply 602 may be a switching type supply which has good efficiency but a slow response whereas device 610 may be a linear type device which has lower efficiency but a faster response.

Figure 7:
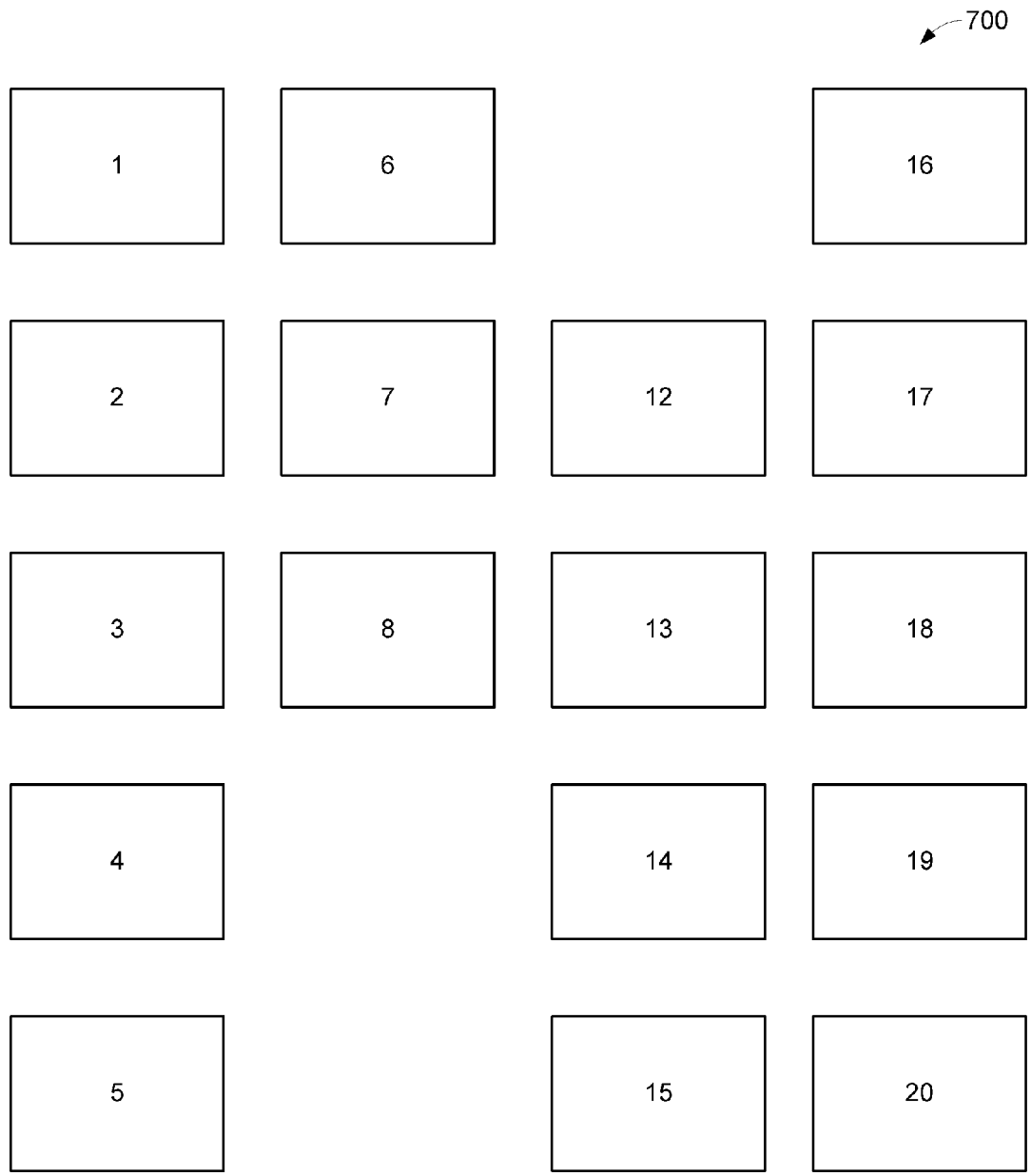
FIG. 7 illustrates various embodiments of the invention.

FIG. 7 illustrates various embodiments of the invention as indicated below.

Illustrated generally at 1. An apparatus for providing power to a load operating at a frequency comprising:

a voltage regulator having a first control device having an input and an output;

said voltage regulator having a second control device having an input and an output;

said first control device input connected to a first power supply source;

said second control device input connected to a second power supply source;

wherein said first control device output and said second control device output are combined in parallel for said providing power to said load operating at said frequency;

wherein said first control device provides power in a first frequency range and said second control device provides power in a second frequency range;

a low pass filter having an input and an output, and a high pass filter having an input and an output, wherein said low pass filter input and said high pass filter input are driven by an error signal generated by comparing a voltage at said load and a reference signal wherein said low pass filter output is connected to a control input of said first control device, and said high pass filter output is connected to a control input of said second control device; and a pull down device with an input, an output, and a control input, said pull down device input connected to said first control device output, and said pull down device control input connected to said error signal.

Illustrated generally at 2. The apparatus of claim 1 wherein a low end of said first frequency range is less than a low end of said second frequency range, and a high end of said second frequency range is higher than a high end of said first frequency range.

Illustrated generally at 3. The apparatus of claim 1 wherein said second power supply source is at a higher voltage than said first power supply source.

Illustrated generally at 4. The apparatus of claim 3 wherein said first power supply source is regulated at a predetermined voltage higher than a voltage at said load.

Illustrated generally at 5. The apparatus of claim 1 wherein said first power supply source is a switching mode power supply source.

Illustrated generally at 6. The apparatus of claim 1 wherein when said frequency is equal to or less than said first frequency said first control device is turned on, and when said frequency is higher than said first frequency said first control device is turned off.

Illustrated generally at 7. The apparatus of claim 1 wherein when said power is below a predetermined level said first control device is turned off regardless of said frequency.

Illustrated generally at 8. The apparatus of claim 5 wherein when said power is below a predetermined level output devices in said switching mode power supply are turned off.

Illustrated generally at 12. An apparatus comprising: an error amplifier with a first input and a second input and a first output and a second output, said error amplifier first input for receiving a signal input, said error amplifier second input for receiving a voltage out; a low pass filter with an input and an output, said low pass filter input coupled to said error amplifier second output; a high pass filter with an input and an output, said high pass filter input coupled to said error amplifier second output; a switching regulator having a first input, a second input, and an output, said first input coupled to said error amplifier first output; said second input coupled to said switching regulator output; a push-pull output stage having a first pull up device, a second pull up device, and a pull down device; said first pull up device having an input, an output, and a control input, said first pull up device control input coupled to said low pass filter output, said first pull up device input coupled to said switching regulator output, and said first pull up device output coupled to a load; said second pull up device having an input, an output, and a control input, said second pull up device control input coupled to said high pass filter output, said second pull up device input coupled to a power source, and said second pull up device output coupled to said load; and said pull down device having an input, an output, and a control input, said pull down device control input coupled to said error amplifier second output, said pull down device input coupled to said load, and said pull down device output coupled to a ground reference.

Illustrated generally at 13. A method for providing power to a load operating at a frequency the method comprising: receiving an input signal, wherein said input signal is generated by comparing a voltage at said load and a reference signal; filtering said input signal into two or more frequency band signals, wherein one of said two or more frequency band signals is a low pass frequency signal, and another one of said two or more frequency band signals is a high pass frequency signal;

using each of said two or more frequency band signals to control power delivery from two or more power supplies, wherein said low pass frequency signal controls a switching mode power supply, and wherein said high pass frequency signal controls a linear mode power supply; and combining an output from each of said two or more power supplies to power a load; and using said input signal to control a pull down device connected across said load.

Illustrated generally at 14. The method of claim 13 further comprising:

determining when said power to said load is below a predefined power level and then disabling one or more of said two or more power supplies.

Illustrated generally at 15. The method of claim 13 further comprising:

determining when said input signal is at or below a predefined frequency and then using said switching mode power supply as one or more of said power supplies.

Illustrated generally at 16. The method of claim 15 further comprising:

determining when said power to said load is below a predefined power level and then disabling one or more output devices in said switching mode power supply.

Illustrated generally at 17. The method of claim 13 wherein one of said two or more power supplies outputs a voltage a preset level above a voltage at said load.

Illustrated generally at 18. The method of claim 13 wherein said two or more frequency band signals may have overlapping signals.

Illustrated generally at 19. The method of claim 13 wherein said combining an output from each of said two or more power supplies is by controlling two or more pass devices.

Illustrated generally at 20. The method of claim 19 wherein said two or more pass devices are each turned on or turned off.

Thus a method and apparatus for fast, efficient, low noise power supply have been described.

Because of the high speeds and noise considerations in embodiments of the present invention (for example, power supply variations) specialized hardware is required.

Figure 1:
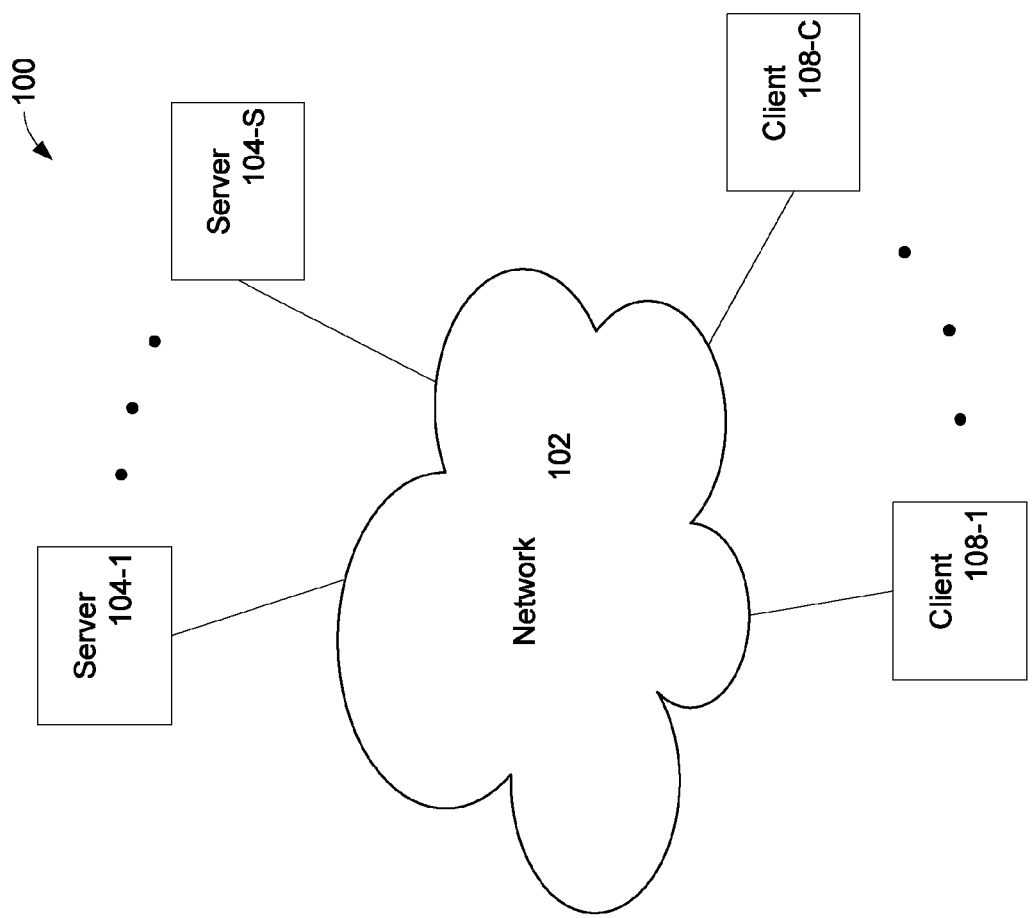
FIG. 1 illustrates a network environment in which the method and apparatus of the invention may be used.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
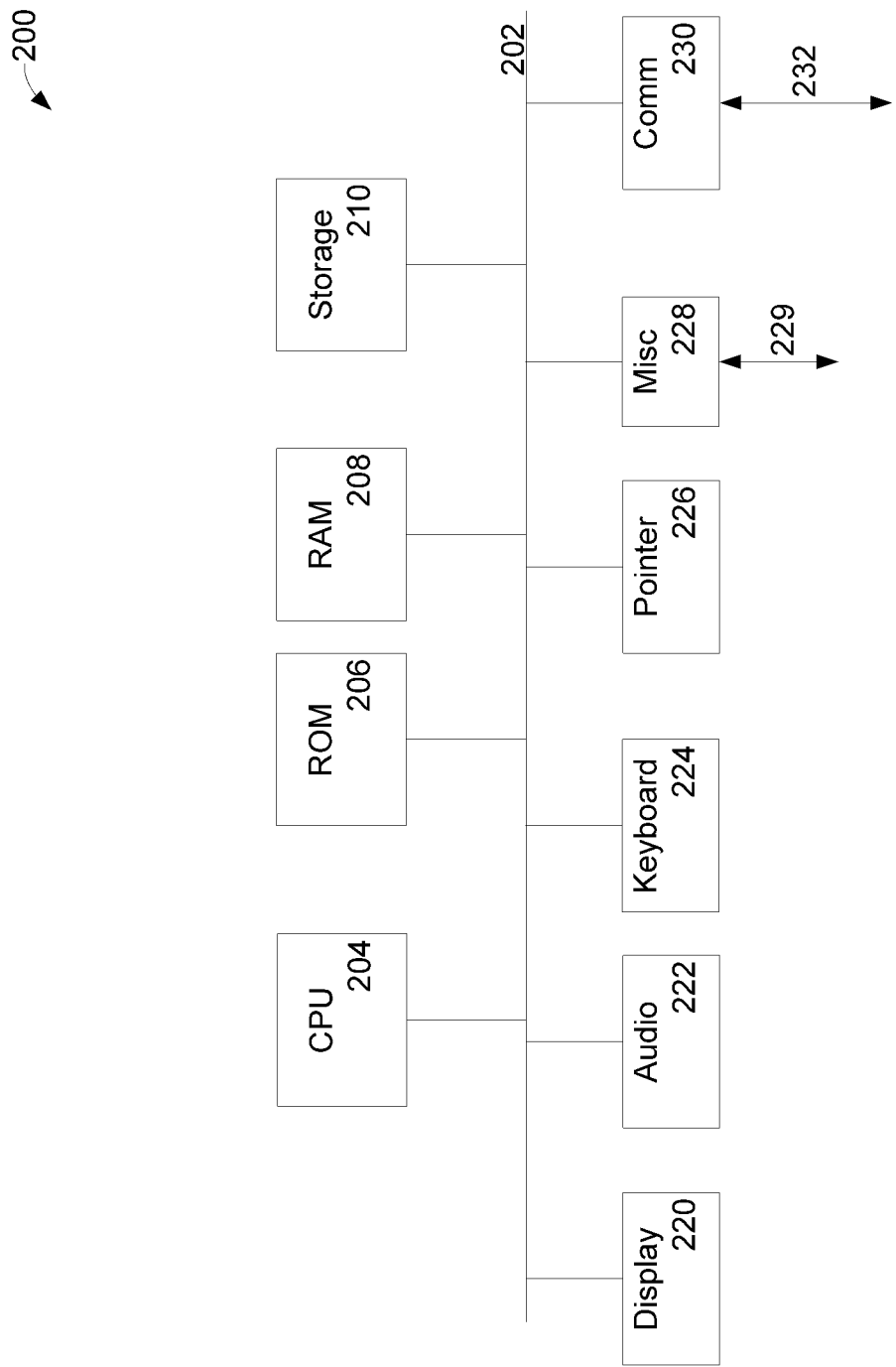
FIG. 2 is a block diagram of a computer system in which some embodiments of the invention may be used.

FIG. 2 is a block diagram of a computer system 200 which some embodiments of the invention may employ parts of in conjunction with required specialized hardware and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be accessed and/or controlled. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be accessed and/or controlled by essentially any type of communicating means or device whether local or remote, such as a LAN, a WAN, a system bus, etc. For example, a network connection which communicates via for example wireless may control an embodiment of the invention having a wireless communications device. For example, Radio Frequency Power Amplifiers in the wireless communication devices need a fast very efficient, low noise power supply. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228 via link 229, and communications 230 via port 232. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc., all non-transitory medium. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible. For example, power supply to the CPU 204 may need to be of fast response. In addition, for a portable device, battery run time is important. The present invention may find application in powering any of the components shown in the block diagram.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate non-transitory physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a non-transitory computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of non-transitory media suitable for storing electronic instructions either local to the computer or remote to the computer.

The techniques presented herein are specifically related to particular computer or other apparatus. A specialized apparatus to perform the required methods is required. For example, any of the methods according to the present invention can be implemented in hard-wired circuitry specifically designed for the functionality disclosed, or by programming special hardware having, for example, in one embodiment, a particular machine such as a computer (or CPU) specifically designed with a 4 bit or greater barrel shift register and a carry look ahead arithmetic logic unit. As disclosed Applicant submits that any results are tied to a particular machine or apparatus and/or transform a particular article into a different state or thing and that such particulars and/or things are non-trivial. For example, in FIG. 2 at 220 is a display. The results of the specialized machine may return an electronic value and such a value can be stored in hardware on the specialized machine and transformed into a graphical representation that can be displayed to a user of the computer. For example, in one embodiment, the returned value may be stored as a group of physical electrons on a trapped gate of a flash memory device. These physical electrons may then be transformed into a graphical representation, for example, by twisting the molecules of a liquid crystal display so that a carrier signal can be modulated and produces on reception a molecular change in a rod and cone receptor of a human user to produce physical electrons thus producing a tangible useful result and transformation tied to a particular machine such as a computer specifically designed with a 4 bit or greater barrel shift register and a carry look ahead arithmetic logic unit. For example the specialized hardware is required for logical operations and comparisons of values. For example, in one embodiment, the returned value may be stored as a series of holes on a paper tape that may be read by a person (e.g. a blind person) by tactile sensation (e.g. output from a KSR-33 Teletype). As disclosed Applicant submits that these results are tied to a particular machine or apparatus and/or transform a particular article into a different state or thing and that such particulars and/or things are non-trivial and as such satisfy Bilski.

The methods of the invention may be implemented using computer software on the specialized hardware as noted supra. If written in a programming language conforming to a recognized standard, sequences of instructions designed to implement the methods can be compiled for execution on the specialized hardware. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action and produce a tangible concrete non-transitory result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a specialized computer system in which the techniques of the present invention may be practiced as well as implemented as an embodiment).

A machine-readable medium is understood to include any non-transitory mechanism for storing or transmitting information in a form readable by a machine (e.g., a computer). For example, a non-transitory machine-readable medium includes read only memory (ROM); random access memory (RAM); magnetic disk storage media; optical storage media; flash memory devices; devices having non-transitory storage.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a method and apparatus for fast, efficient, low noise power supply have been described.

What is claimed is:

1. An apparatus for providing power to a load operating at a frequency comprising:
   a voltage regulator having a first control device having an input and an output;
   said voltage regulator having a second control device having an input and an output;
   said first control device input connected to a first power supply source;
   said second control device input connected to a second power supply source;
   wherein said first control device output and said second control device output are combined in parallel for said providing power to said load operating at said frequency;
   wherein said first control device provides power in a first frequency range and said second control device provides power in a second frequency range;

a low pass filter having an input and an output, and a high pass filter having an input and an output, wherein said low pass filter input and said high pass filter input are driven by an error signal generated by comparing a voltage at said load and a reference signal wherein said low pass filter output is connected to a control input of said first control device, and said high pass filter output is connected to a control input of said second control device; and a pull down device with an input, an output, and a control input, said pull down device input connected to said first control device output, and said pull down device control input connected to said error signal.

2. The apparatus of claim 1 wherein a low end of said first frequency range is less than a low end of said second frequency range, and a high end of said second frequency range is higher than a high end of said first frequency range.

3. The apparatus of claim 1 wherein said second power supply source is at a higher voltage than said first power supply source.

4. The apparatus of claim 3 wherein said first power supply source is regulated at a predetermined voltage higher than a voltage at said load.

5. The apparatus of claim 1 wherein said first power supply source is a switching mode power supply source.

6. The apparatus of claim 5 wherein when said power is below a predetermined level output devices in said switching mode power supply are turned off.

7. The apparatus of claim 1 wherein when said frequency is equal to or less than said first frequency said first control device is turned on, and when said frequency is higher than said first frequency said first control device is turned off.

8. The apparatus of claim 1 wherein when said power is below a predetermined level said first control device is turned off regardless of said frequency.

9. An apparatus comprising:
an error amplifier with a first input and a second input and a first output and a second output, said error amplifier first input for receiving a signal input, said error amplifier second input for receiving a voltage out;
a low pass filter with an input and an output, said low pass filter input coupled to said error amplifier second output;
a high pass filter with an input and an output, said high pass filter input coupled to said error amplifier second output;
a switching regulator having a first input, a second input, and an output, said first input coupled to said error amplifier first output; said second input coupled to said switching regulator output;
a push-pull output stage having a first pull up device, a second pull up device, and a pull down device;
said first pull up device having an input, an output, and a control input, said first pull up device control input coupled to said low pass filter output, said first pull up device input coupled to said switching regulator output, and said first pull up device output coupled to a load;

said second pull up device having an input, an output, and a control input, said second pull up device control input coupled to said high pass filter output, said second pull up device input coupled to a power source, and said second pull up device output coupled to said load; and
said pull down device having an input, an output, and a control input, said pull down device control input coupled to said error amplifier second output, said pull down device input coupled to said load, and said pull down device output coupled to a ground reference.

10. A method for providing power to a load operating at a frequency the method comprising:
receiving an input signal, wherein said input signal is generated by comparing a voltage at said load and a reference signal;
filtering said input signal into two or more frequency band signals, wherein one of said two or more frequency band signals is a low frequency signal, and another one of said two or more frequency band signals is a high pass frequency signal;
using each of said two or more frequency band signals to control power delivery from two or more power supplies, wherein said low pass frequency signal controls a switching mode power supply, and wherein said high pass frequency signal controls a linear mode power supply; and
combining an output from each of said two or more power supplies to power a load; and
using said input signal to control a pull down device connected across said load.

11. The method of claim 10 further comprising:
determining when said power to said load is below a predefined power level and then disabling one or more of said two or more power supplies.

12. The method of claim 10 further comprising:
determining when said input signal is at or below a predefined frequency and then using said switching mode power supply as one or more of said power supplies.

13. The method of claim 12 further comprising:
determining when said power to said load is below a predefined power level and then disabling one or more output devices in said switching mode power supply.

14. The method of claim 10 wherein one of said two or more power supplies outputs a voltage a preset level above a voltage at said load.

15. The method of claim 10 wherein said two or more frequency band signals may have overlapping signals.

16. The method of claim 10 wherein said combining an output from each of said two or more power supplies is by controlling two or more pass devices.

17. The method of claim 15 wherein said two or more pass devices are each turned on or turned off.

\* \* \* \* \*